US006504570B2

(12) United States Patent
LeCompte

(10) Patent No.: US 6,504,570 B2
(45) Date of Patent: *Jan. 7, 2003

(54) DIRECT BROADCAST IMAGING SATELLITE SYSTEM APPARATUS AND METHOD FOR PROVIDING REAL-TIME, CONTINUOUS MONITORING OF EARTH FROM GEOSTATIONARY EARTH ORBIT

(75) Inventor: Malcolm A. LeCompte, Diamondhead, MS (US)

(73) Assignee: Astrovision International, Inc., Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/991,960

(22) Filed: Nov. 26, 2001

(65) Prior Publication Data

US 2002/0089588 A1 Jul. 11, 2002

Related U.S. Application Data

(63) Continuation of application No. 09/860,671, filed on May 21, 2001, now Pat. No. 6,331,870, and a continuation of application No. 09/344,358, filed on Jun. 25, 1999, now Pat. No. 6,271,877.

(51) Int. Cl.$^7$ ................................................ H04N 7/18
(52) U.S. Cl. ..................... 348/144; 348/149; 348/208.1; 348/208.99
(58) Field of Search ................................ 348/144, 149, 348/208, 211; H04N 7/18

(56) References Cited

U.S. PATENT DOCUMENTS

| | | | | | |
|---|---|---|---|---|---|
| 5,654,549 | A | * | 8/1997 | Landecker et al. | 348/208 |
| 6,084,510 | A | * | 7/2000 | Lemelson et al. | 348/144 |
| 6,271,877 | B1 | * | 8/2001 | LeCompte | 348/144 |
| 6,331,870 | B1 | * | 12/2001 | LeCompte | 348/144 |

* cited by examiner

Primary Examiner—Howard Britton
(74) Attorney, Agent, or Firm—Oblon, Spivak, McClelland, Maier & Neustadt, P.C.

(57) ABSTRACT

A system, method and apparatus for collecting an distributing real-time, high resolution images of the Earth from GEO include an electro-optical sensor based on multi-megapixel two-dimensional charge coupled device (CCD) arrays mounted on a geostationary platform. At least four, three-axis stabilized satellites in Geostationary Earth orbit (GEO) provide worldwide coverage, excluding the poles. Image data that is collected at approximately 1 frame/sec, is broadcast over high-capacity communication links (roughly 15 MHZ bandwidth) providing real-time global coverage of the Earth at sub-kilometer resolutions directly to end users. This data may be distributed globally from each satellite through a system of space and ground telecommunication links. Each satellite carries at least two electro-optical imaging systems that operate at visible wavelengths so as to provide uninterrupted views of the Earth's full disk and coverage at sub-kilometer spatial resolutions of most or selected portions of the Earth's surface.

45 Claims, 9 Drawing Sheets

DIRECT BROADCAST IMAGING SATELLITE SYSTEM APPARATUS AND METHOD FOR PROVIDING REAL-TIME, CONTINUOUS MONITORING OF EARTH FROM GEOSTATIONARY EARTH ORBIT

BACKGROUND OF THE INVENTION

1. Field of the Invention

The present invention relates to methods and systems for making global observations of the Earth at sub-kilometer spatial resolutions in real-time, where real-time refers to a delay of not more than two minutes total for creating, refreshing and distributing each image. More particularly, the present invention is directed towards methods, apparatuses and systems that provide real-time coverage of at least 70% of the observable Earth surface at a spatial resolution of less than 1 kilometer.

2. Discussion of the Background

Over the last 30 years, since the first weather monitoring satellite was placed in geostationary earth orbit (GEO), various satellite systems have been used to monitor features of the Earth. The reason is that at GEO the relative motion of the Earth and the satellite is nulled, provided that the GEO orbit is in the Earth's equatorial plane. Accordingly, consistent images may be taken of the portion of the Earth's surface and atmosphere that fall within the footprint of the satellite.

In the Western hemisphere, weather forecasting methods rely heavily on data supplied by the Geostationary Operational Environmental Satellites (GOES) series, operated by the National Oceanic and Atmospheric Administration (NOAA). The GOES series was developed from the prototype "Advanced Technology Systems" 1 and 3 (ATS-1, -3) launched in 1966 and 1967, respectively. These and all subsequent systems have been implemented with scanning imaging systems that are able to produce full disk images of the Earth at 1 km resolution in about 20–30 minutes.

The newest of the GOES satellites (8, 9 and 10) are 3-axis stabilized and are configured to observe the Earth with 1 panchromatic visible and 4 infrared imaging systems per satellite. The visible imaging systems use a "flying spot" scanning technique when a mirror moving in two axes, East–West and North–South, scans a small vertically oriented element of the fully viewable scene (the instrument's full area of regard) across an array of eight vertically arranged silicon pixels. The individual pixel field of view is about 30 $\mu$rad. Each scene element is sampled for just under 50 microseconds. In order to support this slow scanning method, the GOES satellite payload stability must be extraordinarily high so that almost no relative movement occurs between any one scan line of the samples. Accordingly, the payload pointing does not nominally deviate further than $\frac{1}{3}$ of a pixel during an entire, 1 second duration scan. Because there are over 1,300 scan lines to create a full disk image it takes about 22 minutes to create the full image. Operationally, a full disk sampling technique is actually done once every three hours, to allow more frequent coverage of an entire visible hemisphere rather than a more frequent sampling of smaller regions.

During normal operation, GOES series satellites provide gray-scale and infrared images of different portions of the Earth at between 5, 15 and 30 minute intervals. Limited regions may be sampled as frequently as about once per minute, during "super rapid scan operations" (SRSO). In practice, SRSO operations are rarely used because coverage of other areas is too important to be neglected for long periods of time. Moreover, significant Earth-based events that occur during lapses in coverage of a particular region may be missed. In other words, the satellites sensor may be looking an uneventful portion of the Earth's surface when the significant activity is occurring at another portion of the Earth's surface. Furthermore, as recognized by the present inventor, phenomena that may occur at night can only be seen in the infrared channels, which have a much coarser spatial resolution than the visible channel and otherwise are subject to the same limitations that are inherent in a scanning system.

GOES satellites provide a system that is optimized for monitoring cloud motion, but is far less suitable for observing other GEO physical events. At visible wavelengths, clouds are efficient diffuse mirrors of solar radiation and therefore appear white with variations of brightness seen as shades of gray. Color, enhancing the contrast and visibility of the Earth's surface background, may actually detract from cloud visibility in a scene. Moreover, adding color may triple the amount of information and thus size of a digitized image, which creates a burden on the transmission demands for the broadcast portion of the satellite system. Furthermore, observations of significant, but perhaps transient phenomena that occur in time scales of seconds or minutes (such as volcanoes, lightening strikes or meteors) may be late or not observed at all. Accordingly, the information provided from systems like the GOES system is somewhat unreliable because it is not able to provide a high-resolution "watchdog" service that reliably reports real-time information over a significant portion of the Earth's surface. Also, "video" style loops created from successive images having relatively coarse temporal resolution may lack the continuity needed to provide truly reliable information if cloud movements between image samples are much greater than a pixel dimension. The temporal coherence among the pixels of a scanned image and between the co-registered pixels of successive images will degrade as the time required to create the image and the elapsed time interval between scans increases. These effects have a significant adverse impact on the fidelity of any "image" created to represent the state of the Earth at a given moment, but particularly harmful to attempts to build animations using successive co-registered scanned images of a given area.

Referring to FIG. 1, coverage area are shown for various weather satellites in addition to the GOES satellites. The GMS-5, parked at 140° East longitude, is a Japanese weather satellite showing a coverage area that covers the South-East Asia and Australian areas of the world. The Chinese FY (Feng-Yang) satellite is parked at 104° East and shows a substantially overlapping coverage area with the GMS-5 satellite. The European space agency's METEOSTAT-6 satellite, parked in a 0° orbit, requires a license to decrypt and thus limits distribution for three days after observation. In contrast, the GOES, GMS and FY satellites have open reception and distribution via NASA-funded Internet links. Other satellites that perform similar operation include the Indian INSAT-1D, which is parked at 74° East longitude, and the Russian system, GOMS/ELECTRO, which is not currently operational. A common feature of these different satellite systems is that they employ a spin scan or scanning visible imaging systems that require up to 20 minutes or longer to acquire a full disk image of the Earth. Furthermore, the systems use the long scan period to provide a variety of spatial resolutions, but all of which are more coarse than 1 km at the Nadir point.

There have been a number of proposals made in the past by various individuals and groups to place a camera on a large commercial communication satellite positioned in GEO. In each case, the camera would operate as a parasitic device, in that the camera would use the power and communication sub-system of the satellite to support its operational requirements. The most recent and most detailed examples, were made by Hughes Information Technology Corporation, a former subsidiary of Hughes Aircraft Company and the MITRE Corporation. These examples are discussed below.

The Hughes Proposal was described under various names such as "EarthCam", "StormCam", and "GEM" (Geostationary Earth Monitor) and involved a television style imaging system using a two dimensional charge coupled device (CCD) detector array to create an image of 756 pixels wide by 484 pixels high at intervals that range from between two minutes to eight minutes. The frame rate for this TV-style camera was determined by compression limitations in the satellite's meager 1–5 Kbps housekeeping data channel capacity. The Hughes Proposal described placing a digital camera on board one or more of Hughes' commercial telecommunication satellites (COMSAT). This parasitic camera was to operate using power provided by the COMSAT and deliver data to a Hughes ground operation center by way of a very low data rate housekeeping telemetry link. Data was then to be distributed to various users from this single command and control facility.

The system proposed employing cameras placed on board the Hughes satellites to be located at 71° West, 101° West, 30° East and 305° East longitude. Upon receipt, and after processing, data would be distributed via land line or communication satellite links to end-users. The single visible imaging system would operate with a zoom mode so as to achieve 1 km spatial resolution while building a composite hemispheric view from lower resolution images.

As presently recognized, the system proposed by Hughes was deficient in both its camera resources and communication systems infrastructure with regard to the following three attributes. The system proposed by Hughes did not provide real-time images (as defined herein) as a result of the delay between frames. Another deficiency was that real-time images cannot be distributed in real-time, due to the interval between frames and the slow data rate, as well as the single point data reception and distribution facility. Furthermore, the system proposed by Hughes was deficient in its inability to provide hemispheric (fill disk images) in real-time. This limitation is due to the limited telemetry channel capacity, limited camera design and the time required to create a composite full disk image. Accordingly, as is presently recognized, the system proposed by Hughes neither appreciated the significance of providing an infrastructure that would be able to provide real-time images, distribute the real-time images, and provide for the compilation of a composite full disk images in real-time.

In 1995, the MITRE Corporation published a study that was performed in 1993. The study examined the use of parasitic instruments on commercial communications satellites for the dual purpose of augmenting government weather satellites and providing a mechanism for low cost test and development of advanced government environmental monitoring systems. The study performed by MITRE examined in some detail the application of newly developed megapixel, two-dimensional, CCD arrays to geostationary imaging systems. The study concluded that considerable gains in capacity could be achieved using the CCD arrays. Although the advent of CCD arrays as large as 4096×4096 were anticipated at the time the study was performed, the authors recognized that an array of 1024×1024 was the largest practical size available for application at that time.

Two distinct types of CCD array applications were considered, time-delay integration (TDI) and "step-stare" as alternatives to the traditional "spin-scan", or "flying-spot" imaging techniques. The TDI approach can be viewed as a modification of the "flying-spot" in that it uses an asymmetrical two-dimensional array, e.g., 128×1024, oriented with the long axis vertical so as to reduce the number of East–West scans. In this technique, every geographic scene element is sampled 128 times, which increases the signal-to-noise level. However, communication satellites are relatively unstable platforms. With a single pixel integration time on the order to milliseconds, spacecraft movement during the accumulation of over 100 samples may degrade the spatial resolution within any one scene element. This effect, which is in addition to the navigation and registration degradation due to scan line shift, is called "pixel spread". Image spread over long integration periods also degrades or precludes low illumination or night observing at visible wavelengths.

The "step-stare" approach was identified in the MITRE study as being the preferred technique. A large, two-dimensional CCD array in this technique is used to capture a portion of the image of the Earth. The optical pointing is incrementally "stepped" across the face of the Earth by an amount nearly equal to its field of regard at each step. The overlap ensures navigational continuity and registration correctness. With reasonable, but not extraordinary satellite stability, the frame time may be increased to milliseconds so as to achieve required levels of sensitivity without compromising navigational or registration criteria or image quality.

The MITRE study proposes the use of sub-megapixel arrays (1024×512). With a dwell time per frame of approximately 150 milliseconds, an entire composite full Earth disk image at 500 meter spatial resolution could be created from a mosaic of nearly 1,200 frames in relatively few minutes. The maximum exposure time to create an image in daylight is much shorter than 150 milliseconds for most CCD arrays. Furthermore, a reasonably stable satellite undergoes little motion during such a brief time interval thus reducing pixel spread. In order to ensure coverage of the entire Earth's surface, frames are overlapped by an amount defined by the satellite stability. This step-stare technique steps the frames in a line from North to South or from East to West, simultaneously exposing all pixels in an array. This ensures accurate registration and navigation of image pixels.

According to the MITRE study, the time between frames in a 500 meter resolution mosaic image of the Earth is three minutes (equal to the time needed to create the mosaic). As presently recognized, during this three minute interval, the motion of objects observed, such as clouds and smoke plumes, will cause the object's apparent shape to change in a discontinuous fashion. The continuity of successive observations will thus be compromised and degrade "seamless" coverage by an amount proportional to the velocities of the objects causing the shapes to apparently change. This degradation is called image smear and becomes more apparent as the time between frames increases image smear, thus putting a premium on decreasing the time to create a mosaic of the full disk image.

As presently recognized, with sufficient stability, it is possible for a CCD imaging system to allow the shutter to remain open to collect more light to enhance low illumination performance. The impact of CCD arrays in a step-stare scan on night imaging is not noted in the MITRE study. As recognized by the present inventor, low illumination imaging is possible by reducing the stepping rate, and allowing the camera field to dwell on the area of regard for a predetermined amount of time while integrating its emitted light. At the time of the MITRE study, time exposures to achieve night imaging capability would have increased the time to acquire a full disk image of the Earth to about 24 minutes, or about the same amount of time as the flying spot technique. Furthermore, the significance of obtaining real-time night images or the mechanisms needed to obtain the images was never appreciated, and thus not realized. In the MITRE study, data distribution was accomplished either by embedding a low data rate in the spacecraft telemetry, or directly to receive sites by preempting the use of one of the satellite's transponders. While the emphasis was on rapid full disk imaging, no special considerations were given to disseminate the data either live or globally.

In 1995, the Goddard Space Flight Center announced a study called the "GEO Synchronous Advanced Technology Environmental System" (GATES) that was expected to lead the development of a small satellite system equipped with a "push broom" scanning linear CCD array imaging device. This system was to use motion induced by the satellite's attitude control system to make successive scans of the visible Earth's disk. The satellite's attitude control momentum wheels would be used to slew the entire system back and forth 12 times while the field of regard of the camera's linear array is stepped from North to South to achieve a full disk scan in about 10 minutes. This system uses a 1,024 pixel long one-dimensional linear CCD array "flying spot" similar to, but much longer than, the GOES' eight pixel array.

As presently recognized, limitation with the GATES system is that live images are not possible, nor is night imaging. Data was distributed from a single receive site, via the Internet. A limitation with the Hughes proposed system, the MITRE system, and the GATES system, is that none of the systems appreciate the interrelationship between providing a real-time continuous monitoring capability of the entire Earth that is accessible from a geostationary Earth orbit, while providing high resolution images. In part, the limitation with all of the devices is that none of the devices would be able to reliably provide the "watchdog" high resolution imaging function that would provide a remote user with valuable real-time data of dynamic situations occurring at or near the Earth's surface.

SUMMARY OF THE INVENTION

The following is a brief summary of selected attributes of the present invention, and should not be construed as a complete compilation of all the attributes of the inventive system, apparatus and method. The section entitled "Detailed Description of the Preferred Embodiments", when taken in combination with the appended figures, will provide a more complete explanation of the present invention.

One object of the present invention is to provide a method, system and apparatus for real-time collection of hemispherical scale images at sub-kilometer resolution from around the Earth and for distributing the images to users located anywhere on the Earth.

Another object is to provide real-time, continuous image collection at electro-optical (primarily visible, but also infrared and ultraviolet) wavelengths, including color information.

A further object is to provide real-time coverage of the entire viewable Earth from geostationary orbital platforms at sub-kilometer resolutions, while combining full disk and/or global composite images.

Still a further object of the present invention is to provide real-time global distribution of the real-time full disk and/or composite global view, which includes nighttime imaging.

Yet a further object of the invention is to provide live coverage of geophysical phenomena at geostationary observation levels based on high spatial and temporal resolution cameras that would also be able to observe features related to, or due to, human activities on the planet, including city lights at night, large fires, space shuttle launch and re-entry, movement of large maritime vessels, contrails of aircraft and large explosions, for example.

Still a further object of the invention is to provide an ability to seamlessly monitor events from geostationary orbit with a rapid framing system, where such events include the daily movement of large storm systems, migration of the day/night terminator, night side lightening, major forest fires volcanic eruptions, seasonal color changes, bi-monthly transits of the moon, solar eclipses, and the Earth's daily bombardment by large meteors.

The above and other objects are accomplished with a system that includes electro-optical sensors based on multi-megapixel two-dimensional charge coupled device (CCD) arrays mounted on a geostationary platform. In particular, the CCD arrays are mounted on each element of a constellation of at least four, three-axis stabilized satellites in geostationary Earth orbit (GEO). Image data that is collected at approximately 1 frame/sec, is broadcast over high-capacity communication links (roughly 15 MHZ bandwidth) providing real-time global coverage of the Earth at sub-kilometer resolutions directly to end users. This data may be distributed globally from each satellite through a system of space and ground telecommunication links. Each satellite carries at least two electro-optical imaging systems that operate at visible wavelengths so as to provide uninterrupted views of the Earth's full disk and coverage at sub-kilometer spatial resolutions of most or selected portions of the Earth's surface. The same GEO satellites may also accommodate ultraviolet and infrared sensors to augment the visible imaging system data. The sensors on each satellite provide continuous real-time (e.g., 1 frame/sec, with preferably not more than a 2 minute lag time until the data reaches the end user) imagery of the entire Earth accessible surface from each satellite's GEO location, around the clock, at a variety of spatial, spectral and temporal resolutions so as to ensure uninterrupted coverage.

The designated field of view of each visible light imaging system on a given satellite progresses from larger to smaller as the spatial resolution offered increased from coarse to fine. The widest field of view provided by each 2-D CCD imaging system is fixed and encompasses the entire full disk of the Earth as seen from GEO (17.3°). Other imaging systems are free to point and dwell or scan within the area of regard of the widest field of use system. Step-stare scanning is accomplished to create a hemispheric scale mosaic image of the Earth's full disk in real-time at the highest possible spatial resolution while ensuring the most accurate image navigation and registration possible. Each satellite includes at least one of an X-band and KA-band communications transponder that illuminates a footprint that allows the data to be broadcast directly to end users anywhere within the line of sight of the satellites. The antenna may either be a parabolic dish, or a phased array antenna that provides single beam or multibeam coverage.

The real-time data is distributed beyond the satellite's "line-of-sight" using leased transponder bandwidth on a network of at least three commercial communications satellites, a cross-linked connection between imaging satellites, or even a terrestrial based data routing network, or a hybrid between the space-based and terrestrial-based communication assets.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
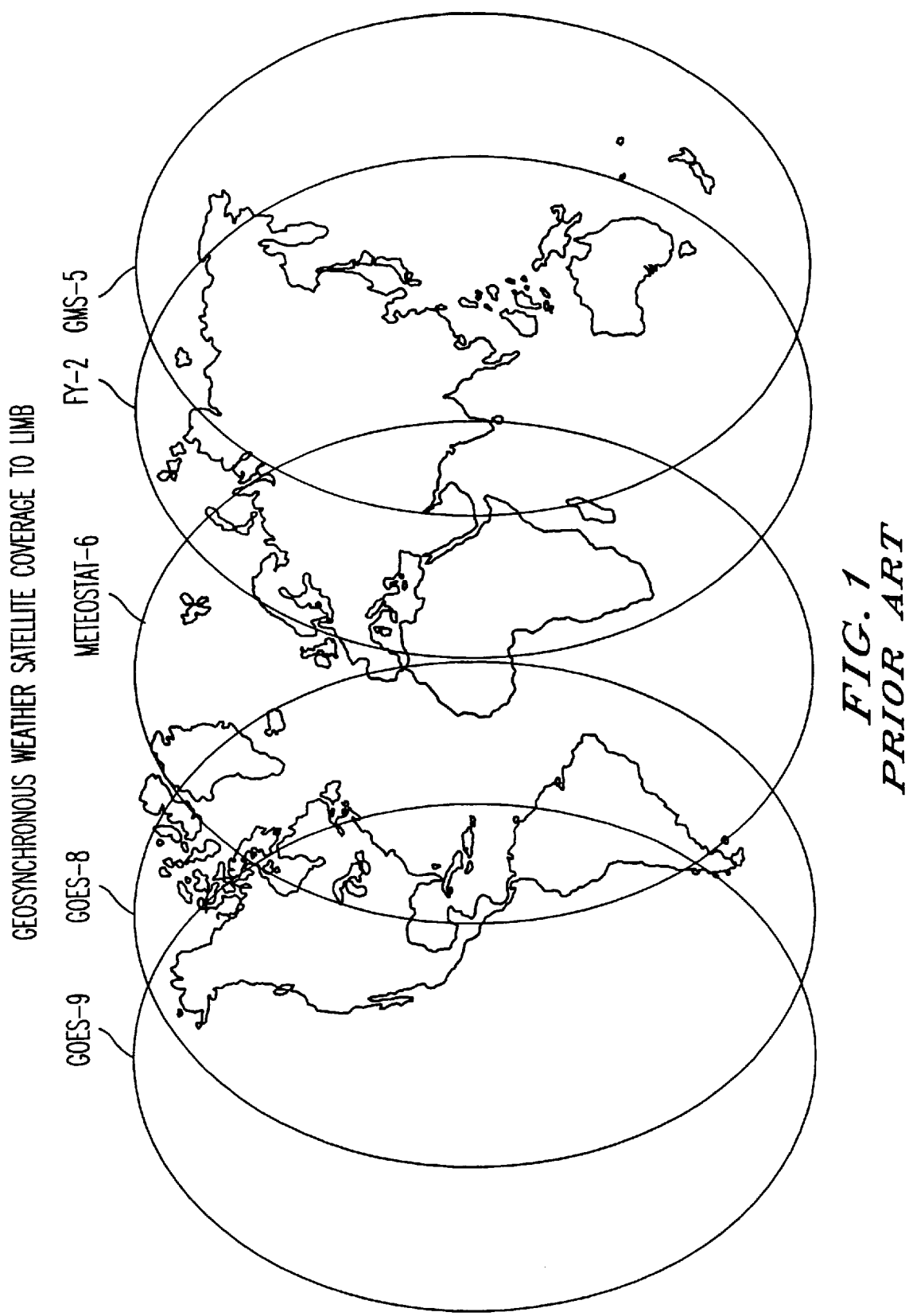
FIG. 1 is a weather satellite coverage chart of several conventional satellites.

Over the past 40 years since the first Sputniks and 30 years after the first weather monitoring satellite was placed in GEO, exploration of the Earth from space remains incomplete and inadequate. As of yet, there exists insufficient mechanisms to observe and study all of the processes that occur day or night and on or near the Earth's surface that may influence life on our planet. Furthermore, there is presently no capability to monitor the entire surface in real-time as a global system and to distribute that data to all parts of the Earth in real-time. The present method, apparatus and system described herein is aimed to provide a comprehensive, simultaneous and real-time observation platform of the Earth's global environment and offer the information gathered from that perspective to a global audience. Accordingly, the coverage is made at temporal and spatial scales and resolutions configured to capture events on Earth that may possibly change over relatively short periods of time and be observable by appropriate electrical-optical sensors configured to mimic the human eye.

A feature of the present invention is to take advantage of the inherent processing capability of the human body, and in particular the human eye coupled with the processing power of the human brain. The human eye is an extremely effective research tool and components employed in the present invention exploit the spectral, spatial, temporal and radiometric attributes that are readily processed by the human eye coupled with the human brain. In particular, attributes of the human eye that are relevant to being the ultimate "detector" of image information include the following:

the human eye is accustomed to making observations in real-time;

the human eye continually refreshes imaged scenes;

the human eye requires similar time scales to both collect and process images;

the human eye provides simultaneous multi spectral (color) coverage of the surrounding environment; and the human eye automatically adjusts to a wide range of varying (diurnal) light levels, gracefully degrading its performance to continue providing valuable information within approximately the same spectral region.

The fact that instruments currently monitoring the Earth's environment are much less capable than the human eye in these respects, ensure that there will be gaps in an observer's ability to observe many important phenomena that occur on or near the Earth's surface, as detected from a space-based sensor. Multi-spectral coverage of the Earth at visible wavelengths during the day, and with sufficient sensitivity to observe phenomena on the Earth at night is rare. In such rare instances, the observation platform is made on low Earth orbiting (LEO) satellites, where it is impossible to develop a full disk, hemispheric or global perspective of the Earth, but only in a scanned sense. Thus, platforms based too close to the Earth fail to exploit the attributes of the human eye and the human brain, which are quickly able to process images that cover an entire scene, including the full disk of the Earth, provided that the data provided to the eye is presented in a way that preserves the true dynamics of the thing being observed and not on an artificial time-scale in which significant time gaps are present between image frame. Providing the images in a discontinuous fashion where significant time gaps are present between frames would fail to capitalize on the processing power of the human eye and brain.

The present invention recognizes that by combining images taken from a GEO platform that remains fixed relative to a specific position on the Earth, avoids an inherent motion between the observed Earth surface, and the observing platform. Furthermore, the perspective offered from GEO allow for a "complete picture" of the Earth's surface to be captured so that the human brain may properly process the entirety of Earth-based events and the observable dynamics of the object being observed. Furthermore, providing the data in the form of images in a real-time fashion allows the coupling between the human eye and the human brain to operate in a seamless fashion and within a time frame that allows for the dissemination of warning signals for Earth inhabitants to take appropriate preventative measures, if necessary. Moreover, observations of the Earth are made from a GEO orbit because the vantage nulls all Earth-satellite differential irrelevant motion. Instruments on board the GEO satellite are able to monitor and record processes that occur on or near the Earth over long periods of time. The same scene is continually in view and may be sampled as frequently as desired.

Remote sensing of the environment is also useful from GEO because that location affords an observer the opportunity to see most of the hemisphere while the lack of relative motion provides a vantage from which to see processes unfold. Theoretically, from GEO, an imaging system can observe to about 8° from a full hemisphere. However, foreshortening of the scene due to the Earth's spherical shape reduces the actual latitude regime that can be effectively monitored. The Northern-most point that is observable to a GEO satellite in an equatorial plane having a camera, lies at about 75° North latitude. However, in an alternative embodiment, one or more polar orbiting satellites may be used to augment the satellites described herein.

The GEO platform offers environmental monitoring that has an advantage of providing a "live" and continuous view of nearly an entire hemisphere. Satellite sensors at GEO have unrivaled opportunity to perform long-term observations of events occurring in virtually any portion of the viewable hemisphere. Transient phenomena such as volcanic eruptions, electrical storms, and meteors, as well as more slowly evolving events like floods, biomass burning, land cover changes are particularly good candidates for study and observation from a geostationary orbit, provided the images are refreshed and sent in real-time. Among the events that may be seamlessly recorded from a geostationary orbit by a rapid framing imaging system according to the present invention include the following events:

daily movement of major storm systems;
 migration of the day/night terminator;
 night-side lightening;
 major forest fires;
 volcanic eruptions;
 sexasonal color changes;
 bi-monthly limb transits of the moon;
 solar eclipses; and
 Earth's daily bombardment by large meteors.

In addition to live coverage of geophysical phenomena at a geostationary vantage point, using high spatial and temporal resolution cameras according to the present invention also enables the observation of features related to, or due to, human activities on the planet, including the following:

city lights at night;
 large fires;
 space shuttle launch and re-entry;
 movement of large maritime vessels;
 contrails of aircraft; and
 large explosions.

In contrast to conventional systems that operate at LEO orbits for observing events on the Earth, the present invention deals with the problem of placing optical sensors much further away from the Earth at GEO, namely 36,000 km above the equator. At this distance, lower spatial resolution is available in order to achieve hemispherical scale coverage at even moderate sampling frequencies. Because these GEO satellites are up to 100 times further from the Earth than LEO satellites, an equivalent imaging system would provide roughly 10 meters of spatial resolution at LEO, while providing about 1 km at GEO.

Another problem that is addressed by the present invention is that the shear size of the Earth poses a problem for making real-time hemispherical scale observations at a kilometer scale (or better) spatial resolution. At GEO, 1 km at the Earth's equator subtends approximately 30 $\mu$rad. The full Earth itself is 17.3° (0.30 rad) in diameter. Monochromatic sampling of a visible hemisphere with sufficient resolution to discriminate features as small as a kilometer would require about one million separate observations. Nearly half a billion samples would be required to produce the same image at 500 meter resolution. To deliver such a large image of the Earth to the ground requires a balance between data communications bandwidth, image production time and resampling frequency. For comparison purposes, a single two-dimensional NTSC television image is made of about 300,000 samples per scene in each color at 30 such scenes per second.

The result-effective variables addressed by the present invention, as presently recognized, include the following:
 spatial resolution;
 temporal resolution (i.e., resampling frequency); and
 area coverage.

Until the recent advent of two-dimensional megapixel CCD arrays, space-based imaging systems fell broadly into two categories. The first category is two-dimensional vidicon-based systems (e.g., television) with low spatial but potentially high temporal resolution. The other imaging system included one-dimensional scanning systems with potentially high spatial (kilometer scale or worse), but low temporal (image resampling much less than every minute) resolution. As previously discussed, either one of such systems would fail to provide an adequate amount of information at reasonable refresh rates so as to provide the human eye and human brain with adequate information to definitively determine, track and assess events occurring at or near the Earth's surface.

Processes monitored from GEO are fundamentally transient in nature. Changes across an imaged area may involve the evolution and migration of features across a scene, such as cloud movement, or the capture of events that materialized and occur within that scene, such as lightening. The form of phenomena tend to evolve more slowly and easily followed by scanning systems. The later phenomena are more readily covered by the vidicon style.

Environmental monitoring from GEO has focused on cloud movements and characteristics due to imaging technology limitations and by the need to achieve good spatial resolution over a hemispherical scale area. These features rely on the cloud shapes changing more slowly within a scene than the cloud movement across that scene and the relationship between spatial and temporal resolutions in monitoring cloud motions.

Scenery sampling frequency is directly proportional to a cloud feature's velocity and inversely proportional to the observing instrument spatial resolution. The equation F=V/R helps explain this phenomena, where F is frequency, V is velocity and R is spatial resolution. For example, a cloud moving at (V=) 100 meters per second (330 kph or 220 mph), observed at a resolution of 1 km=1,000 m) need only be resampled once every 10 seconds (F=0.10/sec) to observe movement across one pixel from sample to sample. Spacecraft pointing instability typically tends to limit the ability to discern movement to greater than 1 pixel per sample, so resampling at lower frequencies is usually acceptable.

For these reasons, imaging the Earth from GEO to discern lateral cloud group movements at spatial resolutions equal to, or coarser than 1 km does not require subminute time resolution. In practice, such sampling may be done a few times per hour or, at most, once per minute at a regional scale. Scanning systems in GEO have traditionally been used to achieve the most satisfactory compromise between image frequency, spatial resolution, area coverage and communication bandwidth. The systems have been equipped with a single pixel or a short linear CCD array mechanically scanned across the face of the Earth to slowly build an image. Such a system cannot make the "real-time", seamless observations provided by the present invention due to the time required to build a two-dimensional image. Image frequency, however, may be reduced by the following factors, which are presently recognized as result effective variables:

increasing the speed of the scan (which reduces sensitivity);

increasing the length of the linear detector array (by adding more detectors); and reducing the size of the area that is scanned.

In order to properly register each pixel relative to the geographic scene, and create a context for navigation within an image built from the scanning process, the spacecraft must be extremely stable. Otherwise, the scanning pixel(s) will "wander" somewhat during the scan and thus destroy the graphic integrity of the scene. Because scanning pixel systems must move the optically sensitive element across the scene, accumulating sufficient light to monitor processes at visible wavelengths is difficult during low-illumination conditions, at night and in real-time. Currently, observations of night city lights in one particular geographic location are only available at low spatial resolution, once a day, from the optical line scanning instrument aboard the low Earth polar orbiting defense meteorological satellite program (DMSP). However, such a system, does not provide the real-time, high resolution, geostationary images provided by the present invention.

The development of two-dimensional multi-megapixel arrays in recent years has for the first time made it possible for the creation of electro-optical systems that can provide real-time, around the clock coverage of the Earth's full disk as seen from GEO at unprecedented spatial resolution. According to the present invention, a constellation of at least four such GEO systems provides real-time coverage at sub-kilometer resolution over most of the viewable Earth. Each satellite provides a "live" broadcast in real-time to end users within the line of sight of each satellite.

As will be discussed, in order to augment the distribution capability for each satellite, leased commercial communication satellite transponders are employed to provide beyond line of sight communication to end users who are not in direct line of sight to the particular satellite that had the sensor for which the user is interested in viewing the images. Alternatively, each Earth observing satellite employs wideband down-link communication channels and cross-linked inter-satellite communication conduits so as to accomplish the distribution function without the use of additional communication pipelines.

As will be discussed herein, there are three distinct components to the method and apparatus described herein for real-time image collection around the Earth and subsequent data distribution of the collected images. The first component is a method, system and apparatus for creating and collecting real-time images. The second component is the imaging infrastructure that allows image coverage of the majority of the planet in real-time, seamless fashion at high-resolution. The third component is the distribution component, which is able to distribute the real-time images to the end users.

Figure 2:
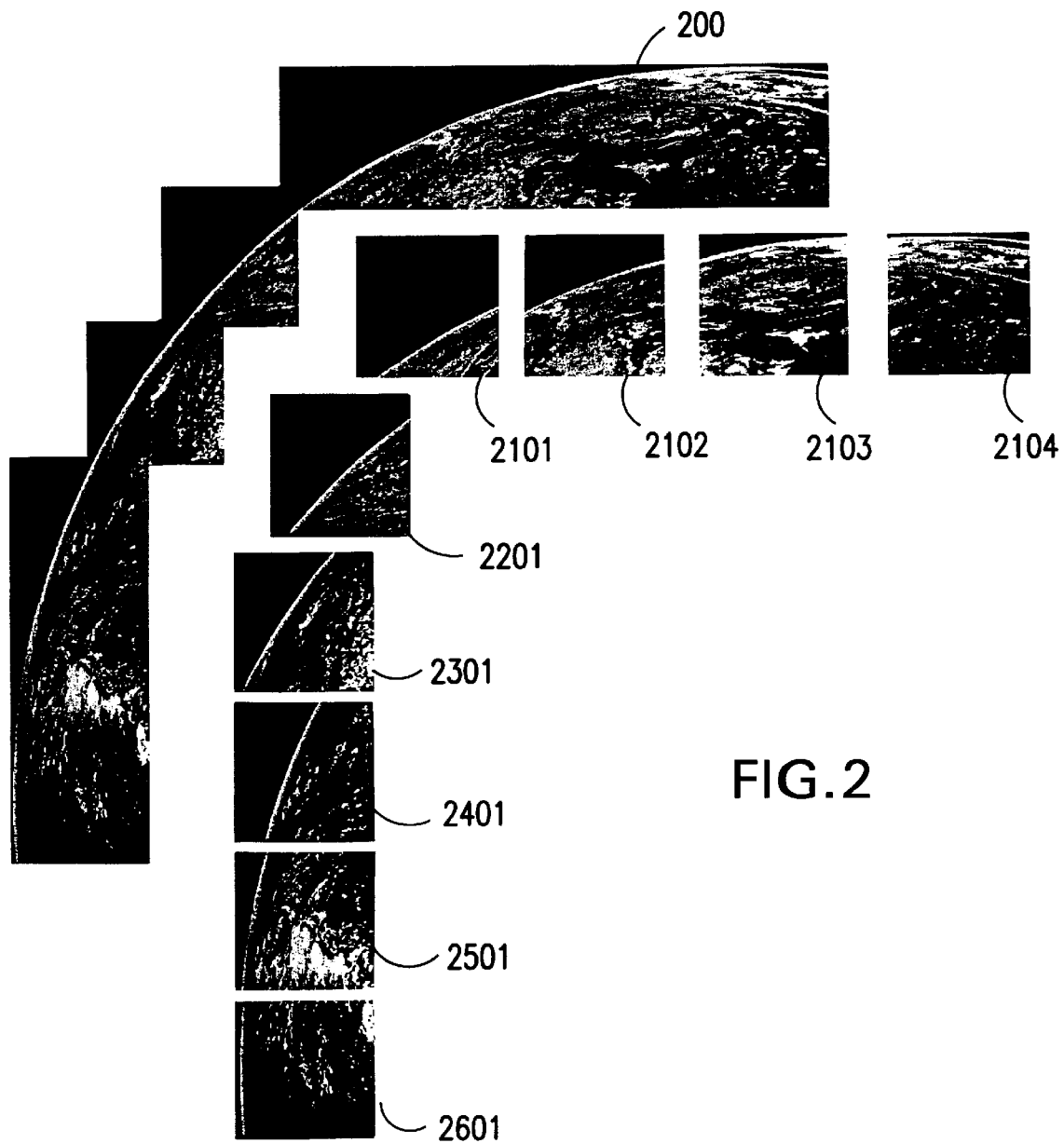
FIG. 2 is an illustration of component images of a step-stare operation of the first seven images of a scan sequence as well as a composite image of the seven images.

FIG. 2 shows a mosaic image of a portion of the Earth created by a step-stare scan technique implemented by the present invention. A full disk mosaic of the Earth may be built from individual frames, some of which are shown in FIG. 2. In FIG. 2, a first line of a mosaic scan image would start from East of the North Pole and would contain seven images moving from East to West. In FIG. 2, the first four images, of seven images, are shown as elements 2101, 2102, 2103, and 2104. The next row contains nine images, the first one of the row being identified as element 2201. Subsequently, the next row of images would contain 10 images in total, the first of which is denoted as 2310. The next five rows would each contain 11 images, the first of which in the first three rows of 11 images are denoted as 2401, 2501 and 2506. The five rows of 11 images are then followed by single rows of 10 images, 9 images and 7 images. This step-stare sequence is represented below where each image is denoted by a four digit code XX-YY. The first two digits (i.e., "XX") represent the row number. The last two digits represent the sequence number of the image in a particular row. For example, 02-04 represents the fourth image of the second row.

01-01, 01-02, 01-03, 01-04, 01-05, 01-06, 01-07

02-01, 02-02, 02-03, 02-04, 02-05, 02-06, 02-07, 02-08, 02-09

03-01, 03-02, 03-03, 03-04. 03-05, 03-06, 03-07, 03-08, 03-09, 03-10

04-01, 04-02, 04-03, 04-04, 04-05, 04-06, 04-07, 04-08, 04-09, 04-10, 04-11

05-01, 05-02, 05-03, 05-04, 05-05, 05-06, 05-07, 05-08, 05-09, 05-10, 05-11

06-01, 06-02, 06-03, 06-04, 06-05, 06-06, 06-07, 06-08, 06-09, 06-10, 06-11

07-01, 07-02, 07-03, 07-04, 07-05, 07-06, 07-07, 07-08, 07-09, 07-10, 07-11

08-01, 08-02, 08-03, 08-04, 08-05, 08-06, 08-07, 08-08, 08-09, 08-10, 08-11

09-01, 09-02, 09-03, 09-04, 09-05, 09-06, 09-07, 09-08, 09-09, 09-10

10-01, 10-02, 10-03, 10-04, 10-05, 10-06, 10-07, 10-08, 10-09

11-01, 11-02, 11-03, 11-14, 11-05, 11-16, 11-07,

By tapering the number of images for the rows covering the Northern and Southern extremes of the Earth (i.e., rows 1–3 and 9–11) allows for the removal of 14 images than if a rectangular, 11×11 raster of 121 images were formed. In total, 107 image frames are accumulated and overlapped with one another so as to form a composite image 200 (which is only a portion of an image shown for demonstration purposes). These 107 frames are accumulated once per second so that events that change rapidly on or near Earth are surely captured and may be presented in a seamless fashion. The image data is captured at 11 bits per pixel and compressed to about 8 bits per pixel. The compressed data is then distributed on a broadband downlink channel (one of N channels, depending if the satellite transponder is also in charge of routing image data to a ground terminal from other imaging satellites). Each of the individual image frames overlap one another by about 10% of their pixel dimensions so as to accommodate satellite drift away from center pointing. An entire disk of the Earth may thus be recorded and transmitted to the ground in less than two minutes total.

Figure 3:
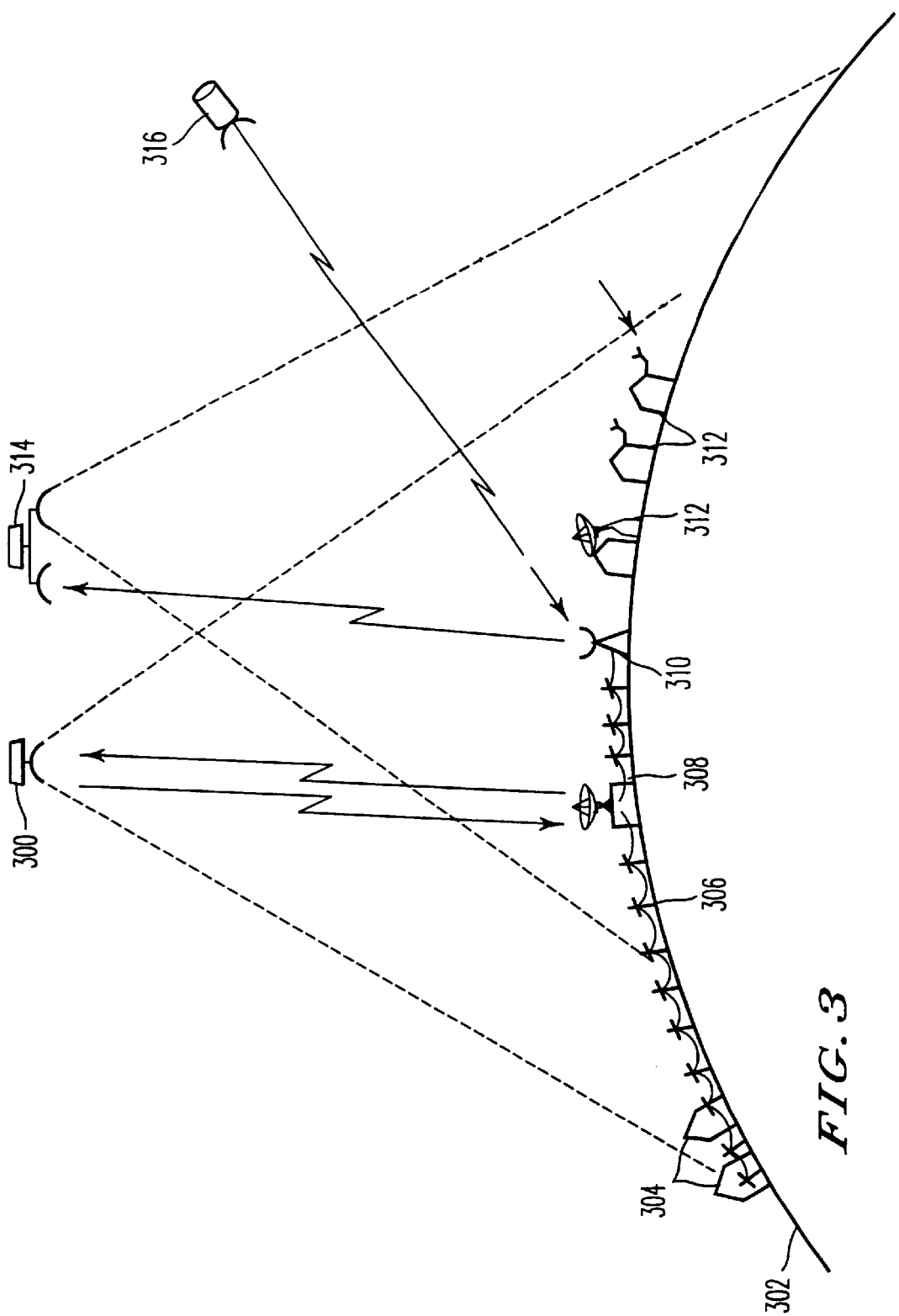
FIG. 3 is an illustration of a geostationary-based real-time high resolution imaging and data distribution system according to the present invention.

FIG. 3 is an illustrative diagram showing how imaging information is collected at GEO and distributed as real-time information to different customers. In FIG. 3, the surface of the Earth 302 is shown to be a curved surface, that limits line of sight communication from either an imaging satellite 300, 314, or communication satellite 316. The system shown in FIG. 3 is configured to allow for the collection of high resolution, real-time image data of the Earth's surface and distribute that data in real-time either directly to subscriber terminals 312 that have their own receive antenna (such as a parabolic dish, phased antenna or the like, or indirectly by way of the communication satellite 316) to teleport device 310. Customers 304 that are beyond line of sight, are more conveniently able to receive information through terrestrial mechanisms, such as the public switch telephone network, Internet connections, wireless links such as LMDS or the like, denoted as a terrestrial based communication link 306. The ground terminal 308 communicates with the imaging satellite 300 in an S-band uplink and in a X-band downlink (or Ka band downlink). Satellite 314 receives information from the imaging satellite 300 and other satellites by way of a satellite cross-link or by way of the teleport 310, as shown. The satellite 314 may then rebroadcast the image data collected at the other satellite in one of the N−1 other communications channels, where N is the number imaging satellites in the system. The satellites 300 and 314 may receive requesting information from remote users by way of the satellite uplinks through either the ground terminal 308, teleport 310 or by way of a satellite cross-link, perhaps from communications satellite 316.

Figure 4:
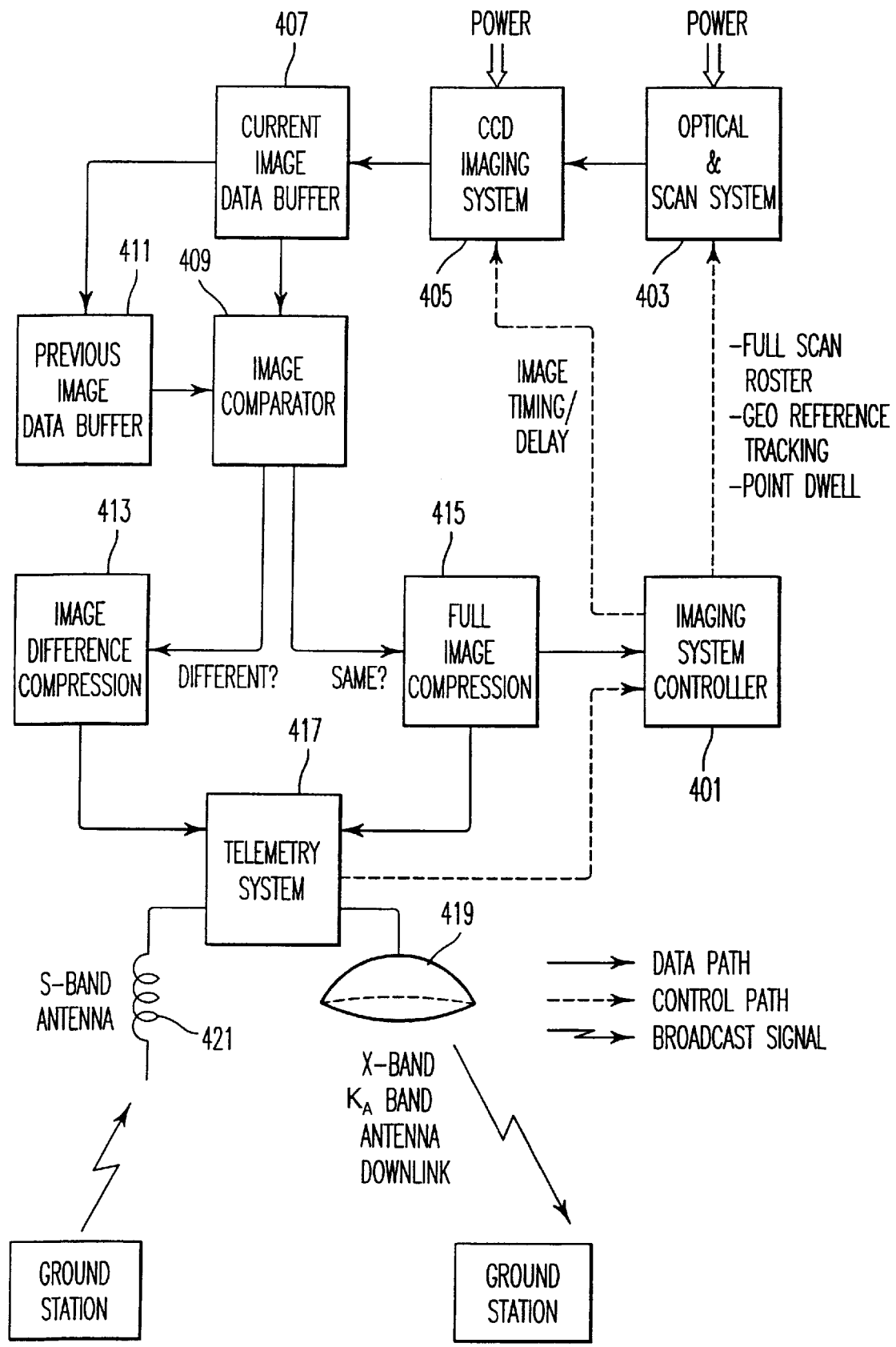
FIG. 4 is a block diagram of system components employed on the image processing portion of the GEO satellite according to the present invention.

FIG. 4 is a block diagram showing the respective signal and control components of the image collection and distribution portion of the imaging satellite 300, shown previously in FIG. 3. The data capture and camera control operations are controlled with an imaging system controller 401 that provides control data to an optical and scan system 403 and CCD imaging system 405. The optical and scan system 403 includes the mechanical/optical component portion of the imaging system, where the optics are fixed. Alternatively, the optics may be controllably adjustable so as to adjust a field of view of the imaging system. In the adjustable configuration, the imaging system controller 401 provides input control signals to the optical and scan system 403 to adjust the optics within the scan system to adjust the field of view. In the present embodiment, where the optics are fixed, the optical and scan system 403 receives scan control signals from the imaging system controller 401, which in turn where received from the ground station in an uplink transmission request message. The selectable scan types include (a) full raster scan, (b) geo-referenced tracking, which tracks a point across the surface of the Earth, and (c) pointing dwells, where the imaging system concentrates on particular portions of the Earth's surface. While three scanning operations are presently described, the present invention is not limited to performing only these three scanning operations, but rather combinations of the three operations, as well as other operations.

The optical and scan system 403 includes a gimbal-mounted mirror that is movable in reply to the command signals received from the imaging system controller 401. The mirror is positioned in the optical train and its orientation sets the area to be imaged on the optics focal plane. As an alternative, the entire satellite itself may be rotated partially by despinning, or accelerating momentum wheels employed on the satellite or expelling a small amount of station keeping fuel, as will be discussed in regard to FIG. 8. By moving the satellite itself, no moving parts are required in the imaging portion of the satellite.

Once the optics have been adjusted, if necessary to provide the desired field of view, the CCD imaging system 405 captures images in electronic format. The CCD imaging system 405 receives timing control signals that direct the frame rate and on/off operation. The CCD imaging system 405 includes a KAH-16801 series 4096(H)×4096(V) array, as described in pixel megapixel full frame CCD image sensor performance specification published by Eastman Kodak, Microelectronics Division, Rochester, N.Y., 14650, the entire contents of which being incorporated herein by reference. Alternatively, a combination of either 2048×2048 pixel CCD or 1024×1024 CCDs may be employed, such as those described in KAI-4000M Series 2048(H)×2048(V) Pixel Megapixel Interline CCD Image Sensor Performance Specification, Eastman Kodak, Microelectronics Division, Rochester, N.Y., 14650, Revision 0, Dec. 23, 1998, and in KAI-1010 Series 1024(H)×1024(V) Pixel Megapixel Interline CCD Image Sensor Performance Specification, Eastman Kodak, Microelectronics Division, Rochester, N.Y., 14650, Revision 4, Sep. 18, 1998, the entire of contents of both of which being incorporated herein by reference. Furthermore, any combination of multiple CCD array units may be employed in multiple cameras. For example, one CCD array unit may be employed with optics that provide a full disk image of the Earth, while a second CCD array is positioned in another optical path that captures an image of a much smaller portion of the Earth's surface.

Once the respective scenes are captured in the CCDs, the CCD imaging system 405 provides a digital output stream to a current image data buffer 407, which holds the images in memory. Previously held digital images are held in previous image data buffer 411, such that the previous image and the current images may be compared in the image comparator 409. Retaining the previous frame also assists in preparing animation loops. If the images are of the same geographic area, (fixed pointing, which always occurs for the wide field camera and occasionally occurs for the high resolution camera), the data is sent to the image difference compression processor 413. However, if the images are not of the same area, the images are routed to the full image compression processor 415.

Subsequently, outputs from the image difference compression processor 413 and full image compression processor 415 are passed to a telemetry system 417, which provide the data protocol formatting and transmission of the signal via a downlink in X-band or alternatively Ka-band via antenna 419. Uplink information from the ground station is provided through an S-band link via antenna 421.

The imaging system controller 401, current image data buffer 407, previous image data buffer 411 and image comparator 409, as well as the image difference compression mechanism 413 and full image compression mechanism 415, may be performed with one or more general purpose processors and associated memory. Alternatively, all or a selected portion of the respective operators and mechanisms may be performed using application specific integrated circuits (ASICs), field programmable array (FPGA) logic and the like.

Various compression algorithms may be employed, including standard off-the-shelf compression algorithms such as MPEG-2, for example, as is explained in Haskel, B. et al, "Digital Video: An Introduction to MPEG-2", Chapman and Hall, ISBN01-412-08411-2, 1996, the entire contents of which being incorporated herein by reference.

The advent of multi-megapixel CCD arrays has made it possible to employ electro-optical systems to obtain coverage of most of the Earth at visible wavelengths, around the clock, and at sub-kilometer resolutions. The method of creating images most simulates the characteristics of the human eye, where the eye itself uses a two-dimensional array of light sensitive detectors able to discriminate "color" and operate in a degraded mode at low light levels. Recent advances in technology have resulted in the creation of multi-megapixel CCD arrays, such as the 2048×2048 Kodak KAI 4000 so that much better resolution can be achieved with a single, starring imaging system. An exposure of only milliseconds in duration is required to create a complete image in daylight, which is much less than the presently defined "real-time" application. With such CCD arrays, an image can be created under GEO night illumination conditions in about one second's time.

As previously discussed, "spin-scan", "flying spot", and "time delay integration" imaging systems are not practical for providing either "real-time" or "around the clock" coverage of the Earth's full disk from GEO. Early proposals to use two-dimensional CCD megapixels were limited by the size of the devices as compared to the size of the Earth. These earlier studies and proposals focused on the ability of sub-megapixel arrays to create coverage of the sunlit Earth in a few minutes, but never considered the interaction between the value of obtaining a seamless sequence of images and allowing the images to be processed with the human eye and brain.

In past schemes, to create a mosaic of the Earth's full disk made up of two-dimensional frames required images to be acquired too rapidly to allow for adequate time exposures. The ability of such a system to image at low light levels is thus compromised. In contrast, two-dimensional multi-megapixel CCD arrays provide a factor of 8 improvement over previous proposals. Individual frame times of up to a second are possible where only about 100 frames are required to create a mosaic of the full disk. With a maximum exposure time of one second, day and night coverage of the full disk is possible. The time required to create a step-stare mosaic of the Earth is merely a factor of 2 faster than previous methods with image smear accordingly reduced.

For space applications, frame transfer CCD arrays (such as Kodak's KAI series) are preferable because they can be electronically shuttered, reducing the susceptibility to mechanical failure. The addition of integrated pixel filters in a CCD (such as the color version of Kodak's KAI series) allows multi-spectral measurements made in a single frame. As frames are compiled in resampling of a given geographic region, its full multi spectral character can be revealed. The class of mechanically shuttered, or full frame CCD arrays such as Kodak's KAH series are as large as 4096×4096 and even larger, which offer the advantage of either increased area coverage or an equivalent area at improved resolution. The addition of either a mechanical filter wheel or a split beam optics architecture with multiple CCD arrays allows multi spectral images to be created at a somewhat slower rate, albeit much faster than the current panchromatic images created by spin scan and flying spot systems.

Finally, the multi-megapixel CCD array based imaging system presented in the present document is small enough in mass and volume and uses sufficiently little power in operating that providing a satellite with multiple electrical-optical sensors is a viable option and is an alternative embodiment. The advantage of multiple sensors becomes apparent in the event of failure or if the normal full disk scan is halted in order to provide high temporal coverage to a particular geographic area. In this event, the additional imaging system can maintain the full disk coverage, either by design at lower resolution or operationally with less frequent sampling of the full disk, alternating with the dwelling adjustments as required.

The global system provided herein is of a satellite carrying at least two visible imaging system, each of which employ a multi-megapixel two-dimensional CCD array to instantaneously capture all reflected light at visible wavelengths within the design spectral range and field of view. The field of view of each system progresses from larger to smaller as the spatial resolution offered increases from coarse to fine. The widest field of view provided by the system with coarsest resolution encompasses the entire full disk of the Earth as seen from GEO (17.3°). The optical bore-sights of all other systems are free to point and can be scanned within the area covered by the widest field of view to create the mosaic of high resolution hemispherical scale images in real-time while ensuring the most accurate image navigation and registration possible.

For example, the CCD imaging system 405 (FIG. 4) incorporates as one of the CCD devices, a 2048×2048 focal plane CCD frame transfer detector array with electronic shuttering so as to provide virtually instantaneous images of the Earth's day and can be created at about 6.5 km of resolution. The satellite has adequate stability to allow the same system to operate in a timed exposure mode to collect images of the Earth at night levels of illumination. The second system, with the same CCD array, operates with 500 meter spatial resolution in series with the wide field instrument. The instrument uses a step-stare scanning scheme to create a full disk image in less than two minutes. Most of the Earth observed by this system is observed at sub-kilometer resolution. As an alternative, a 4096×4096 array may be included either to augment the 2048×2048 CCD, or as a substitute therefor so as to improve the system performance, albeit while quadrupling the data rate required to achieve the same coverage performance, thus requiring a larger telemetry bandwidth than 15 MHZ.

Figure 5:
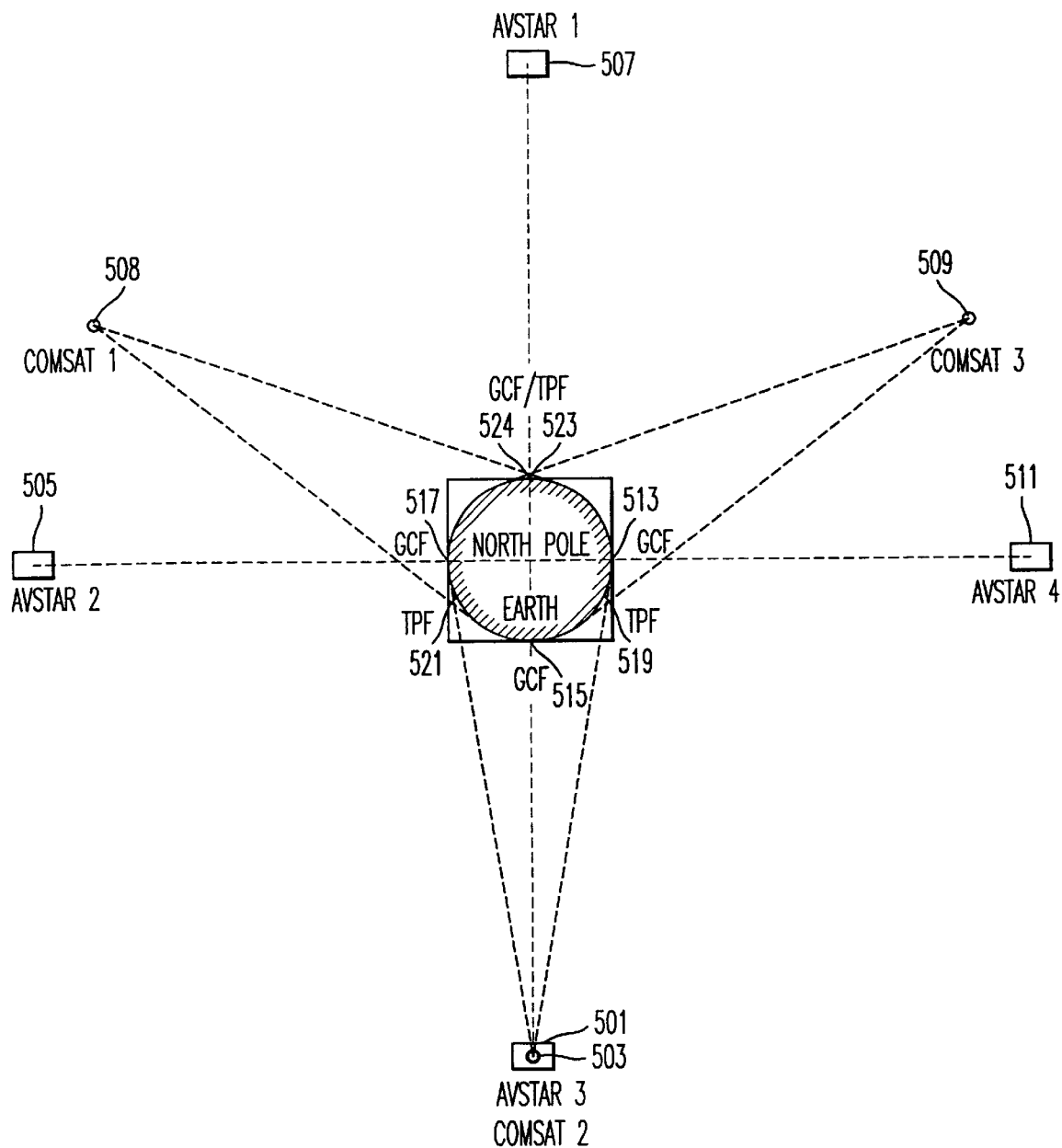
FIG. 5 is a constellation position diagram showing a four-satellite constellation and three satellite communication segment according to the present invention.
Figure 6:
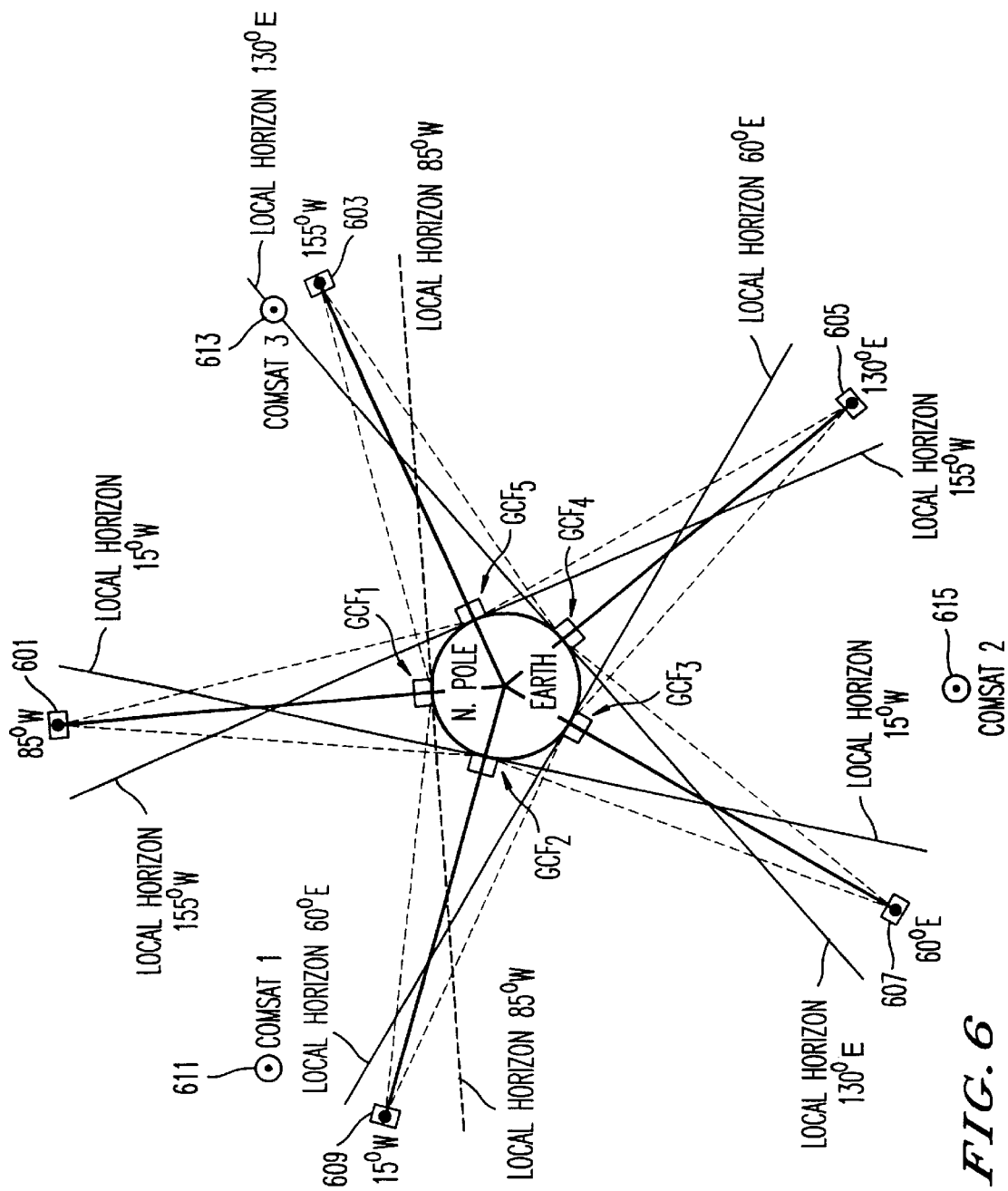
FIG. 6 is similar to FIG. 5, but includes five imaging satellites.

Regarding the method and system for providing global coverage, the present discussion now turns to the relative positioning and numbers of satellites employed at geostationary orbit. To cover most of the Earth from GEO, at a spatial resolution of better than 1 km, requires a constellation of at least four satellites, as is shown in FIG. 5. FIG. 6, as will be discussed, shows a system with 5 imaging satellites.

Before discussing the details of the constellations in FIG. 5 and 6, it is first relevant to recognize that a single GEO satellite with a full disk imaging system provided at a nadir resolution of 500 m is able to observe the Earth's disk between about 75° North and South latitude and plus or minus 75° East and West from the nadir longitude. The effective area of regard is found by inscribing a full circle on the surface of the Earth with its center at the satellite nadir point. In this case, coverage is defined by the circumference created by intersection of the Earth's surface with the base of a cone 75° wide and vertex located at the GEO satellite, as shown. With many satellites, coverage to 75° North and South latitude or 96.6% of the Earth's surface, would be both continuous and complete. However, the number of expensive satellites must necessarily be limited and the image resolution degrades with distance from the sub-solar point. Higher resolution optics provides a wider cone of coverage. A system providing a half-kilometer at nadir provides about 1 km resolution within an area defined by a cone of with 52.5°.

Figure 7:
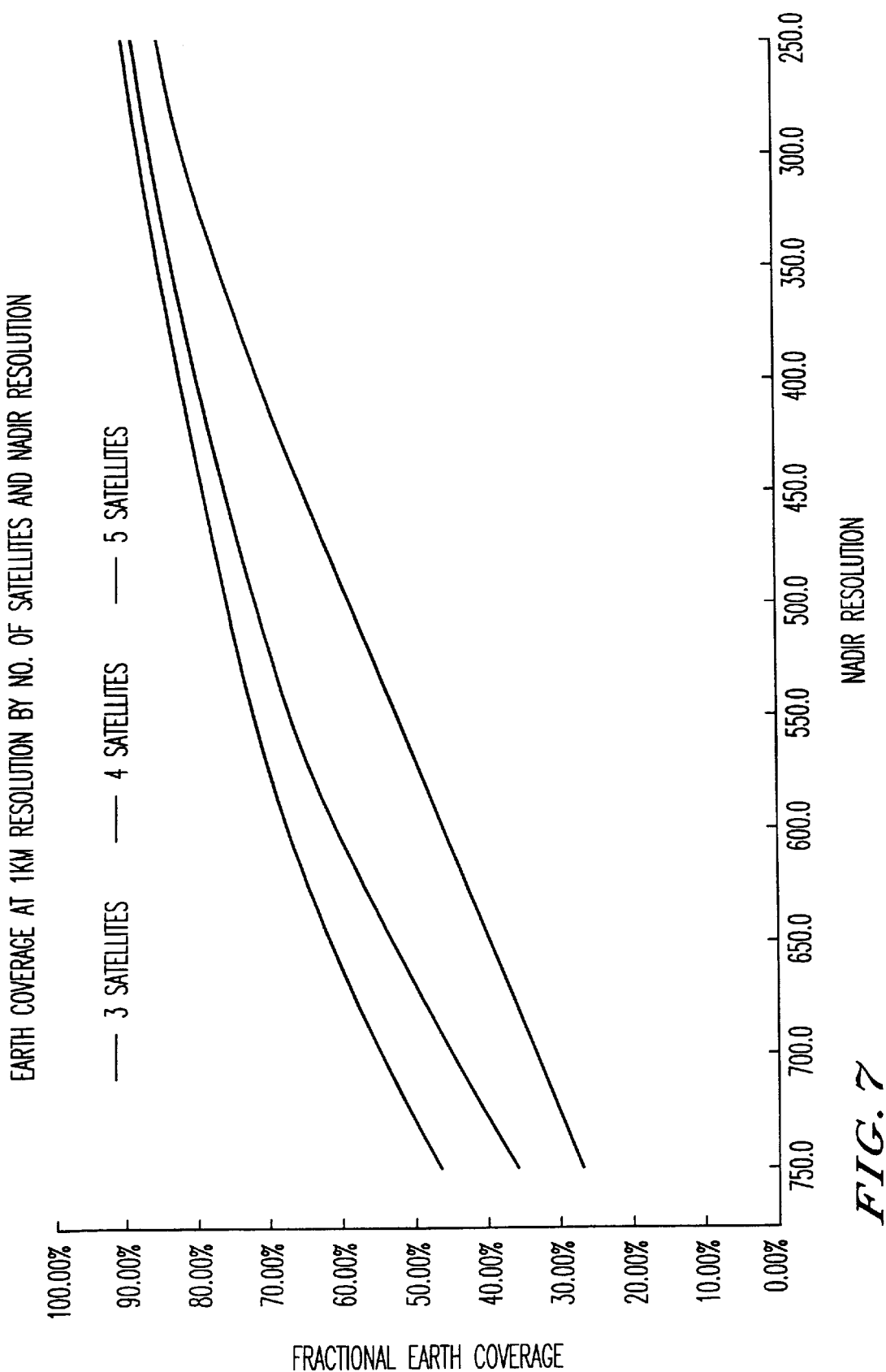
FIG. 7 is a chart showing the amount of Fractional Earth Coverage vs. Nadir Resolution for 3-satellite, 4-satellite, and 5 satellite constellations according to the present invention.

For example, as seen in FIG. 7, three equally spaced satellites can provide sub-kilometer coverage to less than 50% of the globe with a 500 m resolution system. Even with 375 m resolution optics, significant gaps in coverage remain at low and mid-latitudes. In contrast, as shown in FIG. 7, four satellites fill in the gaps and can provide the same level of coverage to nearly three quarters of the Earth. Thus, to cover most of the globe at sub-kilometer resolution, at least four satellites are needed to be equipped with an imaging system having approximately half kilometer resolution. FIG. 7 shows that there is an incremental improvement in increasing from 4 satellites to 5 satellites.

The four satellite arrangement is shown in FIG. 5, with four different imaging satellites 501, 505, 507 and 511. The satellites are augmented with communication satellites 503, 508, and 509. The imaging satellites 501, 505, 507, and 511, as well as the communication satellites 503, 508, and 509, correspond with ground control facilities 515, 517, 523 and 513 as shown. In addition, communication relay teleports 521, 524 and 519 are provided to provide a relay capability.

The purpose and function of the relay capabilities are to assist in the global dissemination and distribution of data captured by the imaging satellites when line-of-sight communications is not possible.

Regarding the global image distribution feature, each of the imaging satellites 501, 505, 507 and 511, transmit image data to the ground using a space to ground communication link, either a X-band or alternatively a Ka-band link using X-band or KA-band transponders. The satellite antenna is shaped and sized to provide a footprint to cover nearly the entire visible hemisphere. Alternatively, the antenna might be configured to provide specific spot beams that may be directed to particular geographic locations to support particular customers. Image data can be broadcast from each satellite directly to users anywhere within the satellite's line of sight. It is also possible to distribute the real-time data from one receiver site using leased transponders on commercial communication satellites 503, 508 and 509. As the capacity of terrestrial based networks, such as the Internet increases, the commercial communication satellites may help supplement this structure, as well as wireless communication nodes such as LMDS as the like. Using the global infrastructure for telecommunications and data distribution, the present invention contemplates incorporating hemispheric distribution from a single receiver sight for each satellite either in a "push-pull" architecture as a separate broadcast or as data available by "pull" via the Internet or other terrestrial based network. The term "push-pull" denotes data that is continually broadcast or can be interactively requested. Data can be pulled off the Internet as often as needed.

Real-time data must be distributed beyond each satellite's line of sight or its GEO horizon. This can be done using a leased transponder bandwidth on a network of at least three commercial communication satellites, or alternatively, using cross-linked connections between the imaging satellites, or a combination of the two.

Real-time global distribution of multi-megapixel images requires that the remote sensing platform space to ground communication sub-system have adequate telemetry bandwidth to transmit data as fast as it is collected. The amount of bandwidth actually required, typically 15 MHZ per channel, can be decreased by data compression techniques. Enough bandwidth should be allocated on each communication satellite to carry the data from each satellite element of the constellation, which includes at least 15 MHZ of bandwidth for each camera on each satellite. Although three communication satellites provide a communications link between the hemispheres, gaps in coverage exist since much of the Earth's surface at mid to high latitudes between satellites is not in direct line of sight. Just as four GEO observing platforms provide more complete coverage of the surface, four communication satellites, spaced equally around the globe can broadcast data directly to end users, at least until high capacity ground communications links are fully developed in all regions of the world.

Distributing data by commercial telecommunications satellites requires at least one ground station for each imaging satellite to act as a "bent pipe". This station re-routes data that it receives directly via a standard ground-based communications line to at least one "teleport" where it is transmitted to the communications satellite for further distribution. The teleport facilities may also act as bent pipes for accepting data transmissions from other imaging satellites positioned beneath the local horizon. Ultimately, a communications satellite above the horizon of any point on Earth between about 70° North and South latitude will distribute data from those satellites which are below the local horizon, and for which direct broadcast is not possible. Moreover, to avoid a distribution bottleneck, the data is preferably broadcast over a wide as possible area so as to allow reception anywhere within the line of sight of the satellite.

FIG. 6 is similar to FIG. 5, although five different imaging satellites 601, 603, 605, 607 and 609 are provided. In the scenario shown in FIG. 6, three communication satellites support around the world communications for distributing the data received at the imaging satellites. Of coarse, additional communication satellites and teleports may be used as well.

Figure 8:
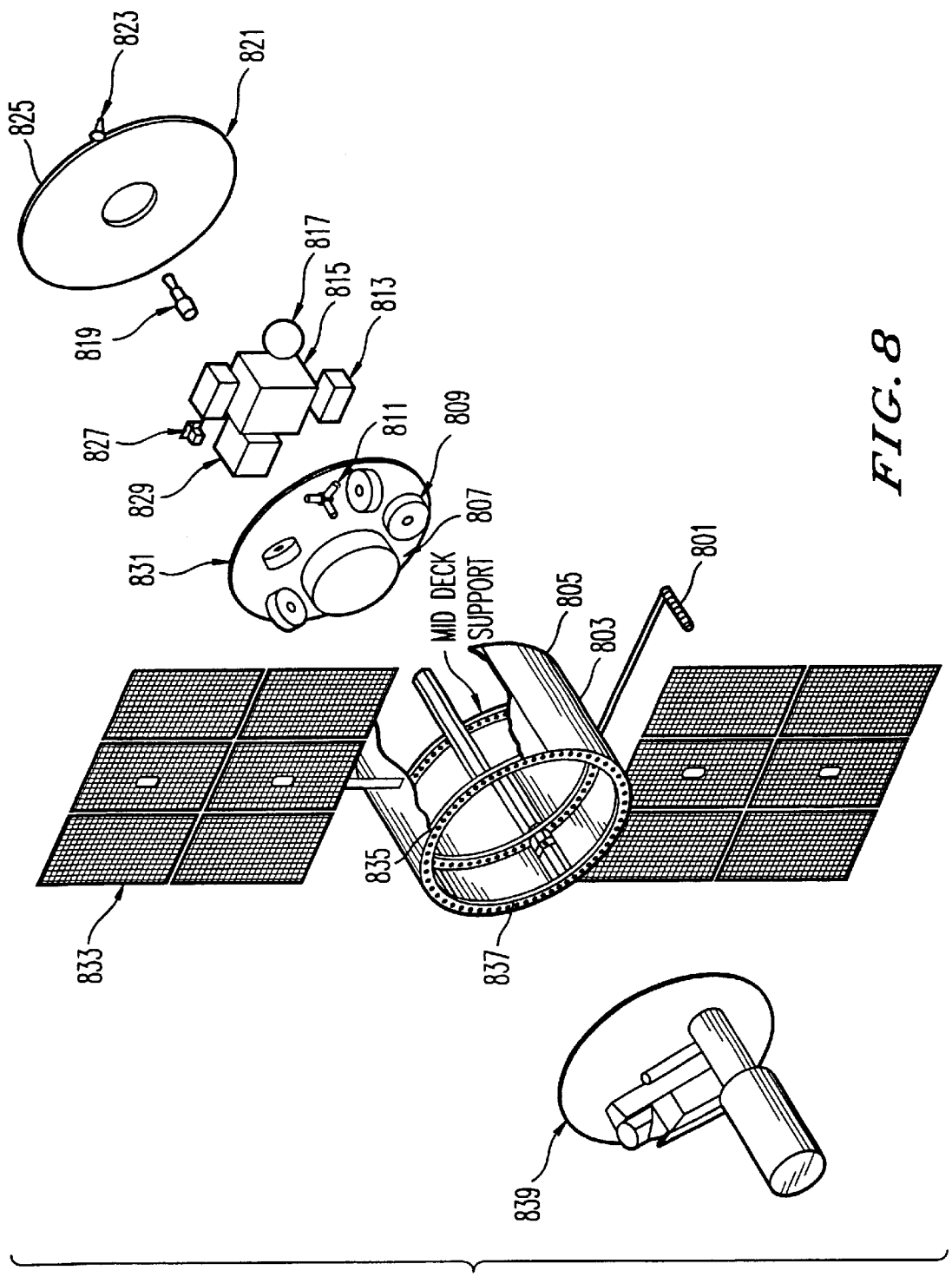
FIG. 8 is an exploded diagram of components of the imaging satellite according to the present invention.

FIG. 8 is an exploded diagram of the imaging satellite employed in the present invention. Communications antennas are included on the satellite such as antennas 801 and 823, which provide communication links for control and data distribution. The structure of the satellite includes star sensors 803, radiators 805, thrusters 837 and payload support 835. The star sensors 803 serve as attitude control mechanisms that detect a relative position of the satellite and Earth so that the imaging system may be properly aligned. Solar panels 833 provide power to the system. In addition, various batteries 825 are provided on the off-deck 821 and provide power to a main motor 819. Pressure tank 817 is hosted on an on-board processor 815 which provides system control functions. The transponders 813 are included to provide a communication capability between the satellite and other satellites in a cross-link or to a ground station. Accelerometers 811 and momentum wheels 809 provide the mid-deck 831 portion of the satellite with an ability to stabilize the satellite. In one alternative embodiment, the scanning operation performed by the satellite when scanning across the Earth's image is performed by despinning the wheels 809 by a predetermined amount so that the satellite rotates a specific amount in order to capture the desired image according to a particular scan sequence. This scanning operation is performed in coordination with an inertial reference 827, so that the amount of satellite spin is controlled. Communication data link 829 provides a proprietary data link for supporting X-band or KU-band communications for example to support the at least N channels of communication used to distribute data. Payload deck 839 supports the imaging portion of the satellite that captures images of the Earth.

Figure 9:
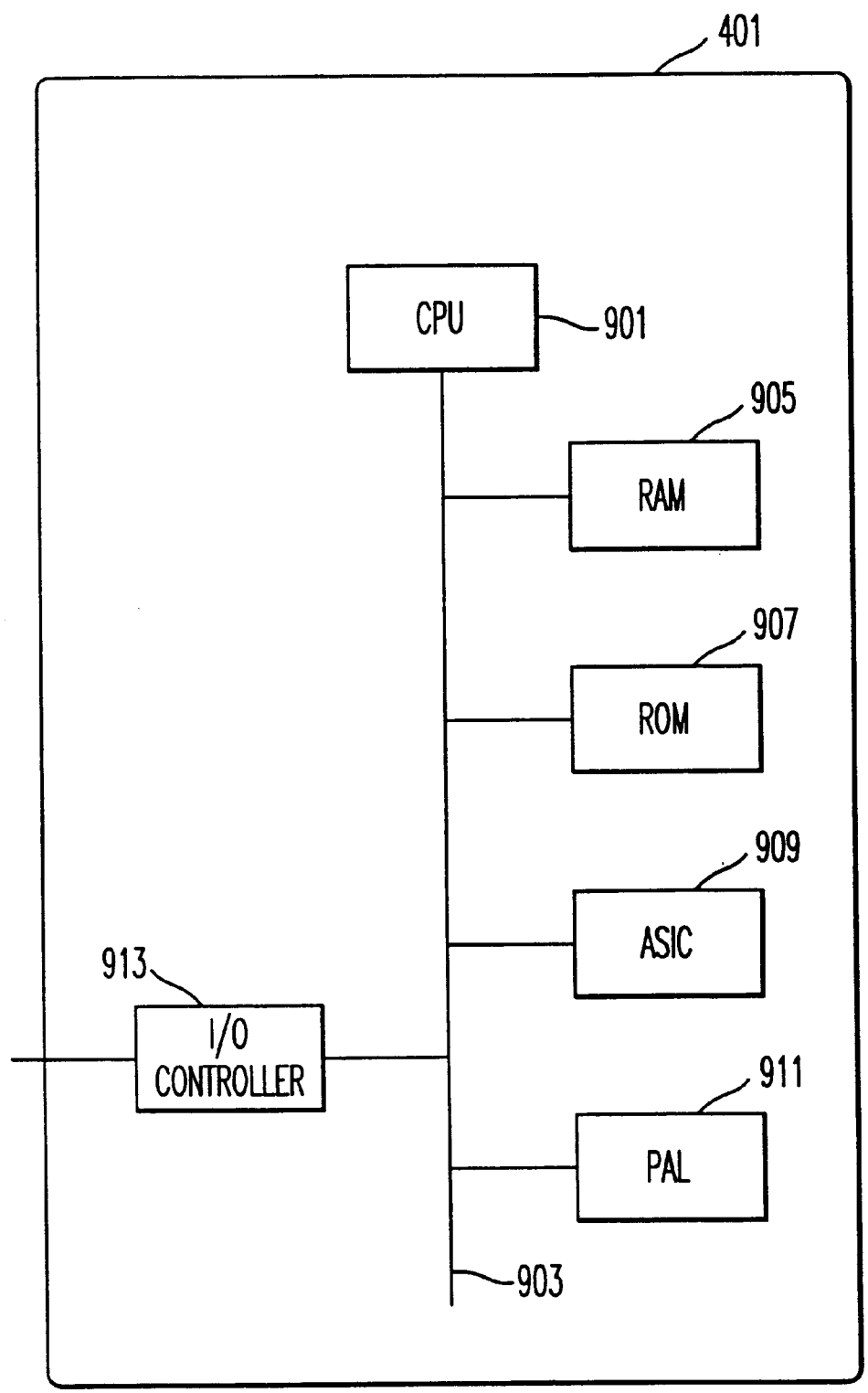
FIG. 9 is a block diagram of components included in a controller hosted on the geostationary imaging satellite according to the present invention.

FIG. 9 is a block diagram of the imaging system controller 401 previously described in FIG. 4. The controller 401 uses a system bus 903 to interconnect a CPU 901 with associated hardware. In particular, the CPU 901 receives software instructions from ROM 907, which contains control algorithms to implement either full disk operation, GEO-reference tracking operation that tracks a point across the surface of the Earth, and a dwell point determination algorithm so as to have the imaging system dwell in a particular direction for a predetermined period of time. RAM 905 holds temporary data, that may be used when receiving data from the telemetry system 517 (FIG. 4), as well as decision information provided by the image comparator 409 by way of the full image compression mechanism 415. ASIC 909 and PAL-911 cooperate with the CPU 901 to perform in a hardware fashion, algorithms that are optionally performed in the CPU 901. Outputs from the CPU 901 are passed through an I/O controller 913, to the optical and scan system 403 (FIG. 4) and CCD imaging system 405 (FIG. 4).

The mechanisms and processes set forth in the present description may be implemented using a conventional general purpose microprocessor(s) programmed according to the teachings of the present specification, as will be appreciated to those skilled in the relevant arts. Appropriate software coding can readily be prepared by skilled programmers based on the teachings of the present disclosure, as will also be apparent to those skilled in the relevant arts.

The present invention thus also includes a computer-based product that may be hosted on a storage medium and include instructions that can be used to program a computer to perform a process in accordance with the present invention. This storage medium can include, but is not limited to, any type of disk including floppy disks, optical disks, CD-ROM, magneto-optical disks, ROMs, RAMs, EPROMs, EEPROMs, Flash Memory, Magnetic or Optical Cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

What is claimed is:

1. An imaging system configured to be deployed on a satellite in geostationary orbit, comprising:
    an image sensor configured to be positioned toward Earth when in geostationary orbit and configured to produce data of a first image frame and a second image frame of at least a portion of a surface of the Earth, said image sensor configured to capture the first image frame in not more than 1 second, and capture the second image frame in not more than one second; and
    a transmitter configured to transmit the data for the first image frame to a remote location within two minutes of being captured by the image sensor so that the first image may be viewed at said remote location, and said transmitter being configured to transmit the data for the second image frame to the remote location within two minutes of being captured by the image sensor so that the second image may be viewed at the remote location within two minutes of being captured, wherein
    said first image frame and said second image frame having respective resolutions that correspond with an image at nadir having at least a 500 m resolution when said satellite is positioned in geostationary orbit.

2. The imaging system of claim 1, wherein:
    said first image frame and said second image frame are part of a series of image frames that are configured to be viewed at said remote location as a mosaic of at least a portion of the surface of the Earth.

3. The imaging system of claim 2, wherein:
    said mosaic being a full disk mosaic of a visible portion of said surface of the Earth, as viewed by said image sensor from said geostationary orbit. said image sensor includes a focal plane array.

4. The imaging system of claim 3, wherein:
    said focal plane array includes a charge coupled device having at least 2048×2048 elements.

5. The imaging system of claim 4, wherein:
    said charged coupled device includes at least 4096×4096 elements.

6. The imaging system of claim 1, further comprising:
    an optics subsystem configured to adjust a field of view of said image sensor.

7. The imaging system of claim 6, wherein:
    said field of view of said image sensor is set to capture human activity on Earth.

8. The imaging system of claim 7, wherein:
    said image sensor is configured to capture said first image frame and said second image frame at a predetermined temporal resolution so as to enable observation at said remote location of said human activity as the human activity evolves.

9. The imaging system of claim 7, wherein:
    said human activity that is observable and captured by said image sensor in said first image frame and said second image frame includes an explosion.

10. The imaging system of claim 7, wherein:
    said human activity that is observable and captured by said image sensor in said first image frame and said second image frame includes a fire.

11. The imaging system of claim 7, wherein:
    said human activity that is observable and captured by said image sensor in said first image frame and said second image frame includes a light at night.

12. The imaging system of claim 7, wherein:
    said human activity that is observable and captured by said image sensor in said first image frame and said second image frame includes re-entry into Earth's atmosphere of a space craft.

13. The imaging system of claim 7, wherein:
    said human activity that is observable and captured by said image sensor in said first image frame and said second image frame includes a contrail of an aircraft.

14. The imaging system of claim 7, wherein:
    said human activity that is observable and captured by said image sensor in said first image frame and said second image frame includes movement of a maritime vessel.

15. The imaging system of claim 6, wherein:
    said field of view of said image sensor is set to capture transient phenomena on Earth.

16. The imaging system of claim 15, wherein:
    said transient phenomena includes biomass burning.

17. The imaging system of claim 15, wherein:
    said transient phenomena includes storm system movement.

18. The imaging system of claim 15, wherein:
    said transient phenomena includes a forest fire.

19. The imaging system of claim 15, wherein:
    said transient phenomena includes color changes of biomass.

20. The imaging system of claim 19, wherein:
    said color changes of biomass includes seasonally induced color changes.

21. The imaging system of claim 6, wherein:
    said image sensor and said optics subsystem are configured to provide said first image frame and said second image frame with a resolution in an inclusive range of 500 m through 375 m.

22. The imaging system of claim 1, wherein said image sensor is configured to populate said first image frame with image data of a first color, and said second image frame with image data of a second color.

23. The imaging system of claim 1, further comprising:
    a second image sensor having a poorer resolution than the at least 500 m resolution exhibited by the image sensor used to provide data to the first image frame and the second image frame.

24. A method for capturing and distributing image data from geostationary orbit, comprising steps of:
    forming a first image frame and a second image frame of at least a portion of a surface of Earth, including
        forming the first image frame and the second image frame at a frame rate of 1 second per frame or faster, and forming the first image frame and the second image frame with respective resolutions equating to 500 m or better if taken at nadir;

producing data for the first image frame and the second image frame; and transmitting the data to a remote location.

25. The method of claim 24, wherein:

said first image frame and said second image frame are part of a series of image frames that are configured to be viewed at said remote location as a mosaic of at least a portion of the surface of the Earth.

26. The method of claim 25, wherein:

said mosaic being a full disk mosaic of a visible portion of said surface of the Earth, as viewed by said image sensor from said geostationary orbit.

27. The method of claim 26, further comprising:

adjusting a field of view of said image sensor with an optics subsystem.

28. The method of claim 27, wherein:

the steps of forming the first image frame and forming the second image frame include capturing data indicative of human activity on Earth.

29. The method of claim 28, wherein:

said capturing step includes capturing said first image frame and said second image frame at a predetermined temporal resolution so as to enable observation at said remote location of said human activity as the human activity evolves.

30. The method of claim 28, wherein:

said human activity that is observable and captured by said image sensor in said first image frame and said second image frame includes an explosion.

31. The method of claim 28, wherein:

said human activity that is observable and captured by said image sensor in said first image frame and said second image frame includes a fire.

32. The method of claim 28, wherein:

said human activity that is observable and captured by said image sensor in said first image frame and said second image frame includes a light at night.

33. The method of claim 28, wherein:

said human activity that is observable and captured by said image sensor in said first image frame and said second image frame includes re-entry into Earth's atmosphere of a space craft.

34. The method of claim 28, wherein:

said human activity that is observable and captured by said image sensor in said first image frame and said second image frame includes a contrail of an aircraft.

35. The method of claim 28, wherein:

said human activity that is observable and captured by said image sensor in said first image frame and said second image frame includes movement of a maritime vessel.

36. The method of claim 27, wherein:

said adjusting step includes setting said field of view so as to capture transient phenomena on Earth.

37. The method of claim 36, wherein:

said transient phenomena includes biomass burning.

38. The method of claim 36, wherein:

said transient phenomena includes storm system movement.

39. The method of claim 36, wherein:

said transient phenomena includes a forest fire.

40. The method of claim 36, wherein:

said transient phenomena includes color changes of biomass.

41. The method of claim 40, wherein:

said color changes of biomass includes seasonally induced color changes.

42. The method of claim 27, wherein:

said image sensor and said optics subsystem are configured to provide said first image frame and said second image frame with a resolution in an inclusive range of 500 m through 375 m.

43. The method of claim 24, wherein:

said step of forming a first image frame and a second image frame of at least a portion of a surface of the Earth includes
populating the first image frame with image data of a first color and said second image frame with image data of a second color.

44. The method of claim 24, further comprising a step of:

forming another set of image data with a second image sensor having a poorer resolution than the at least 500 m resolution exhibited by the image sensor used to provide data to the first image frame and the second image frame.

45. An imaging system configured to be deployed on a satellite in geostationary orbit, comprising:

means for forming a first image frame and a second image frame of at least a portion of a surface of Earth, including
means for forming the first image frame and the second image frame at a frame rate of 1 second per frame or faster, and
means for forming the first image frame and the second image frame with respective resolutions equating to 500 m or better if taken at nadir;

means for producing data for the first image frame and the second image frame; and means for transmitting the data to a remote location.

* * * * *